United States Patent
Ayguen

(10) Patent No.: US 9,505,061 B2
(45) Date of Patent: Nov. 29, 2016

(54) CHUCK

(75) Inventor: Hakki Ayguen, Goeggingen-Krauchenwies (DE)

(73) Assignee: Guehring KG, Albstadt (DE)

( * ) Notice: Subject to any disclaimer, the term of this patent is extended or adjusted under 35 U.S.C. 154(b) by 315 days.

(21) Appl. No.: 14/129,118

(22) PCT Filed: Jun. 13, 2012

(86) PCT No.: PCT/DE2012/100177
§ 371 (c)(1),
(2), (4) Date: Apr. 3, 2014

(87) PCT Pub. No.: WO2013/000457
PCT Pub. Date: Jan. 3, 2013

(65) Prior Publication Data
US 2014/0232072 A1    Aug. 21, 2014

(30) Foreign Application Priority Data
Jun. 29, 2011   (DE) .................. 20 2011 103 203 U

(51) Int. Cl.
*B23B 31/20* (2006.01)
*B23B 31/30* (2006.01)
*B23B 31/00* (2006.01)
*B23B 31/02* (2006.01)

(52) U.S. Cl.
CPC .......... *B23B 31/204* (2013.01); *B23B 31/003* (2013.01); *B23B 31/30* (2013.01); *B23B 31/028* (2013.01); *B23B 2231/00* (2013.01); *B23B 2231/24* (2013.01); *B23B 2231/44* (2013.01); *Y10T 279/1241* (2015.01); *Y10T 279/1249* (2015.01); *Y10T 279/1283* (2015.01); *Y10T 279/17111* (2015.01); *Y10T 279/21* (2015.01); *Y10T 279/25* (2015.01); *Y10T 279/3487* (2015.01)

(58) Field of Classification Search
CPC . B23B 31/204; B23B 31/30; B23B 2231/24; B23B 2231/28; B23B 2231/44; Y10T 279/1249; Y10T 279/1283; Y10T 279/1241; Y10T 279/3487; Y10T 279/17111; Y10T 279/1208
See application file for complete search history.

(56) References Cited

U.S. PATENT DOCUMENTS

| | | | | |
|---|---|---|---|---|
| 2,461,579 A | * | 2/1949 | Thomas ............ | B23B 29/03428 279/6 |
| 2,558,815 A | * | 7/1951 | Briney, Jr. ........ | B23B 29/03428 279/6 |
| 2,780,467 A | * | 2/1957 | Jackson ............ | B23B 29/03428 279/6 |
| 2,793,041 A | * | 5/1957 | Barbier ............. | B23B 29/12 279/126 |
| 2,812,672 A | * | 11/1957 | Sainati ............. | B23B 29/03478 279/6 |

(Continued)

FOREIGN PATENT DOCUMENTS

| | | | | |
|---|---|---|---|---|
| DE | 91 09 821.1 | | 11/1991 | |
| DE | 10244759 A1 | * | 4/2004 | ............ B23B 31/02 |

(Continued)

*Primary Examiner* — Eric A Gates
(74) *Attorney, Agent, or Firm* — Muirhead and Saturnelli, LLC

(57) ABSTRACT

A chuck for a power tool has a central receptacle, arranged in the body of the chuck, having a locating opening for axially inserting a shank-type tool. A reducing sleeve is arranged at least partly in the central receptacle, and a clamping device is provided for at least locally reducing the cross section of the central receptacle. A fixing device is provided which specifies a defined arrangement of the reducing sleeve in relation to the locating opening both with the chuck clamped and with the chuck unclamped.

17 Claims, 1 Drawing Sheet

(56) References Cited

U.S. PATENT DOCUMENTS

| | | | | |
|---|---|---|---|---|
| 3,357,711 A * | 12/1967 | Fischer | B23B 31/36 | 279/6 |
| 3,542,354 A | 11/1970 | Fitzpatrick | | |
| 3,712,386 A * | 1/1973 | Peters | A61C 1/0007 | 173/221 |
| 3,835,649 A * | 9/1974 | Le Testu | B23B 31/204 | 279/4.04 |
| 4,422,653 A * | 12/1983 | Piotrowski | B23B 31/204 | 279/2.03 |
| 4,460,200 A * | 7/1984 | Rasmussen | B23B 31/204 | 279/4.08 |
| 5,979,911 A * | 11/1999 | Rinne | B23B 31/204 | 279/4.08 |
| 6,015,154 A * | 1/2000 | Andre | B23B 31/305 | 279/2.07 |
| 6,053,508 A * | 4/2000 | Kuhl | B23B 31/117 | 279/102 |
| 6,224,067 B1 * | 5/2001 | Lindstrom | B23B 31/204 | 279/4.09 |
| 6,497,417 B2 * | 12/2002 | Wu | B23B 31/204 | 279/4.08 |
| 7,134,812 B2 * | 11/2006 | Beckington | B23Q 1/0036 | 279/20 |
| 7,357,607 B2 * | 4/2008 | Vlismas | B23B 31/1075 | 279/20 |
| 7,785,046 B2 * | 8/2010 | Beckington | B23B 31/02 | 279/20 |
| 7,914,010 B2 * | 3/2011 | Herud | B23B 31/028 | 279/156 |
| 8,066,457 B2 * | 11/2011 | Buettiker | B23B 31/1107 | 279/20 |
| 8,360,695 B2 * | 1/2013 | Haenle | B23B 31/028 | 279/20 |
| 2006/0091618 A1 * | 5/2006 | Rosberg | B23B 31/1172 | 279/4.01 |
| 2006/0131820 A1 | 6/2006 | Andre et al. | | |
| 2007/0216113 A1 * | 9/2007 | Schuster et al. | B23B 31/204 | 279/2.08 |
| 2010/0270757 A1 * | 10/2010 | Beckington | B23B 31/1179 | 279/20 |
| 2011/0156363 A1 * | 6/2011 | Haimer | B23B 31/02 | 279/20 |
| 2012/0211950 A1 * | 8/2012 | Matheis | B23B 31/028 | 279/20 |
| 2013/0292913 A1 * | 11/2013 | Teusch | B23B 31/1178 | 279/2.06 |

FOREIGN PATENT DOCUMENTS

| | | | | |
|---|---|---|---|---|
| DE | 102004003271 B3 * | 10/2005 | | B23Q 17/005 |
| DE | 20 2006 009 555 U1 | 9/2006 | | |
| DE | 10 2006 016 290 A1 | 10/2007 | | |
| DE | 202011004231 U1 * | 8/2011 | | B23B 31/201 |
| EP | 0 164 582 A1 | 12/1985 | | |
| GB | 833048 A * | 4/1960 | | B23B 31/026 |
| JP | 10-29106 | 2/1998 | | |
| JP | 2011-36930 A | 2/2011 | | |
| WO | WO 95/26247 | 10/1995 | | |

\* cited by examiner

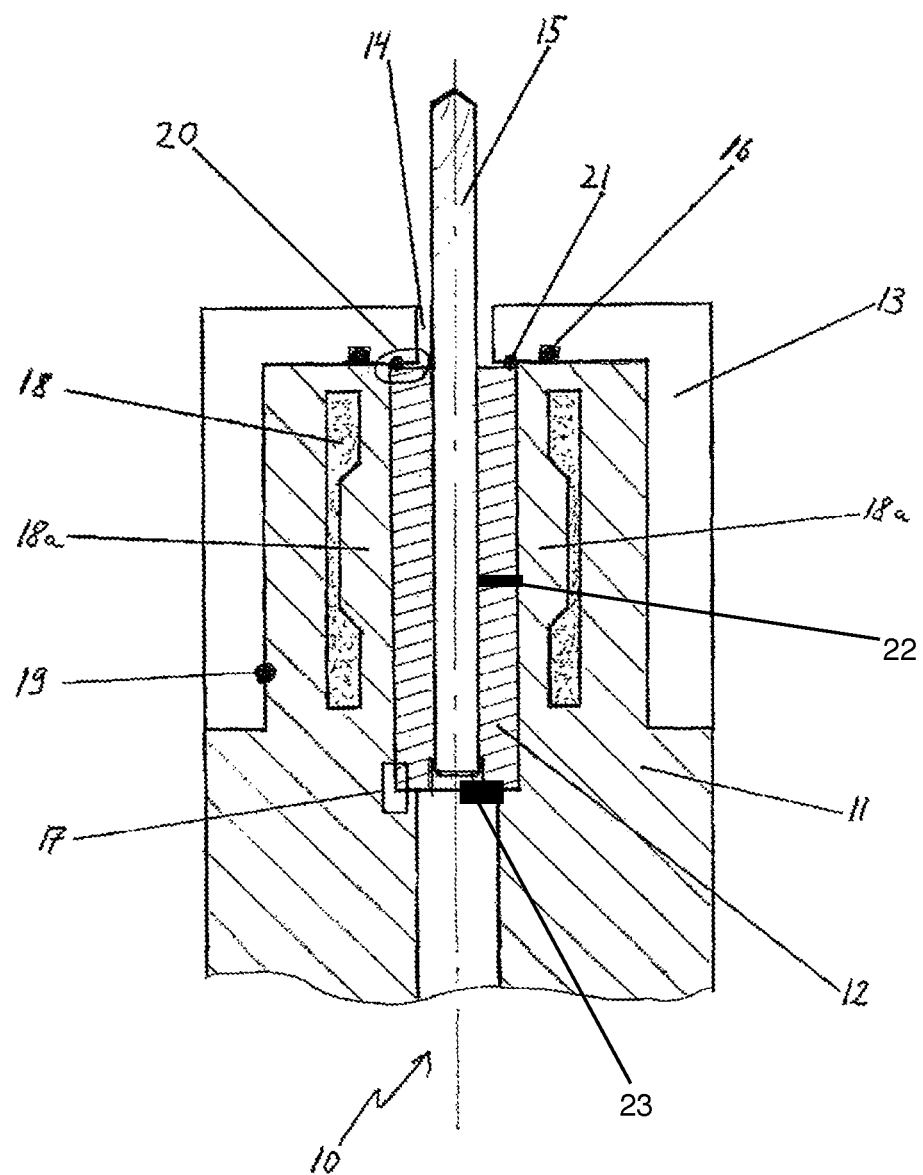

CHUCK

TECHNICAL FIELD

This application relates to a clamping chuck for a machine tool, in particular hydraulic expansion clamping chucks, expansion clamping chucks, shrink chucks and similar clamping chucks.

BACKGROUND OF THE INVENTION

In clamping chucks of said type, different tools, which can be inserted into a receiving opening in the body of the clamping chuck, can be fixed in non-positively locking fashion for the purpose of then performing a material machining process by means thereof. Said clamping chucks are suitable both for static machining and also for rotary machining, in which the tool is conventionally set in rotational motion.

In the present disclosure, the expressions "axial" and "radial" are used in relation to the direction of extent of the receiving opening in the working direction, which in the case of rotary tools normally coincides with the axis of rotation of said rotary motion.

The fixing of the respective tool is in this case generally realized by virtue of the tool being firmly clamped within the receiving opening by means of a local deformation of the wall of the receiving opening. This may for example be achieved by virtue of a chamber being provided within the body of the clamping chuck, into which chamber a hydraulic liquid can be introduced at such a high pressure that a partition wall between the chamber and receiving opening is deformed reversibly in the radial direction such that the cross section of the receiving opening is reduced, and the tool inserted into said receiving opening is firmly clamped.

For this purpose, however, high pressures are required, which pressures furthermore vary depending on the cross section of the receiving opening. If pressures from 120 000 000 Pa (1200 bar) to 150 000 000 Pa (1500 bar) are typically required for receiving openings with an 8 mm cross section, this rises to as high as 400 000 000 Pa (4000 bar) to 500 000 000 Pa (5000 bar) for a 3 mm cross section. This can have the effect that the range of elastic deformations is departed from and plastic deformations begin to occur. The cross-sectional reduction that can be effected in this way is thus limited.

It is known from the prior art to circumvent this problem by virtue of a reducing sleeve being arranged in the receiving opening of the clamping chuck. This eliminates the need to work with small cross sections and extremely high pressures. In general, the reducing sleeve, like the tool itself, can be exchanged and thus adapted for example to the tool diameter. A problem here is however the fact that radial run-outs can arise, specifically with greater intensity the longer the clamping chuck and tool are. Eccentricities of clamping chuck and reducing sleeve can add up. An example of such clamping chucks is known for example from DE 94 112 60.

Accordingly, it would be desirable to provide an improved clamping chuck with a reducing sleeve.

SUMMARY OF THE INVENTION

The clamping chuck according to the system described herein, in particular expansion clamping chuck, particularly preferably hydraulic expansion clamping chuck for a machine tool, has a central receptacle which is arranged in the body of the clamping chuck and which has a receiving opening for the axial insertion of a shank-type tool, a reducing sleeve arranged at least in sections in the central receptacle, and a clamping device for the at least local reduction of the cross section of the central receptacle.

According to the system described herein, a fixing device is provided which prescribes a defined arrangement of the reducing sleeve relative to the receiving opening both when the clamping chuck is clamped and also when the clamping chuck is not clamped.

The expression "defined arrangement" is in this case used not only to encompass precisely accurate fixing but also to encompass mutual relative mobility within certain limits, such as is the case for example when a pin is guided in a slot or when elastic damping of a relative movement is provided, said elastic damping becoming more intense the further the parts arranged in a defined manner relative to one another deviate from a setpoint position.

Fixing according to the system described herein may be realized for example by means of screw connection, clamping, pinning or adhesive bonding.

Through the provision of a fixing device of said type, it is ensured that the reducing sleeve and receiving opening can be aligned relative to one another already during the production of the clamping chuck and remain in said aligned arrangement. Here, an arrangement in which compensation of eccentricities of said components is achieved with maximum effectiveness is regarded as a preferred criterion for the alignment or for the state intended as the optimum arrangement. This has the effect that the demands on concentricity as prescribed by DIN 69882 can be surpassed by a factor of four.

In an embodiment of the system described herein, the reducing sleeve and/or the clamping chuck bear a marking 22 which designates the preferred relative position of reducing sleeve and receiving opening. Said marking 22, which is advantageously applied during the production process, makes it possible at any time to check whether the optimized concentricity characteristics are still present or not, for example because the fixing device has been damaged during operation.

In the case of a particularly preferred fixing device, an anti-twist securing means is provided which prevents twisting of the reducing sleeve in the receiving opening. A displacement of the reducing sleeve in the receiving opening should also be prevented in as effective a manner as possible, which may be achieved for example through the provision of an axial securing means.

It has however proven to be preferable for both the anti-twist securing means and also the axial securing means to be designed such that the limitation of the twisting or displacement is realized with elastic action. Specifically, this may for example be realized by virtue of the reducing sleeve being subjected to pressure by means of an O-ring composed of an elastic material. In this way, when corresponding forces act, limited mobility is indeed provided which would not be provided in the case of a hard stop.

An alternative particularly preferred possibility for ensuring an elastic limitation of the twisting or displacement of the reducing sleeve is to provide a freely floating mounting of the reducing sleeve.

With regard to the axial displaceability, this can be achieved particularly effectively if the reducing sleeve, on its side facing toward the surface of the receiving opening, has grooves which extend parallel to the axis of rotation of the reducing sleeve proceeding from the two face sides of the reducing sleeve but which do not merge into one another.

The grooves thus form a dead end in each case at their end facing toward the central section of the reducing sleeve. In the case of floating mounting in an oil or in coolant for the tool, said oil or coolant enters into the grooves and the interaction of the liquid with the dead-end-like ends dampens any movements of the reducing sleeve in an effective manner. This is true in particular if no dirt channels are simultaneously provided on the inner surface of the tool receptacle.

It is particularly advantageous if, on the clamping chuck, peripheral cooling for the shank-type tool is provided in order to prevent excessive heat generation in the tool and to improve the disposal of chips. This increases the reliability of the chip-forming cutting process. It is particularly expedient for the peripheral cooling to be directed and to run onto the chip-forming cutting tool. Even more expedient are Gyrojet peripheral cooling arrangements in which jet guidance in parallel along the shank and cutting edge of the tool is ensured.

To realize effective cooling, it is also advantageous for the clamping means and/or the reducing sleeve to have one or more slots, one or more bores or one or more openings for permitting the passage of coolant. In particular, said slots are preferably arranged on the inner side of the reducing sleeve. The cross section of said slots may be freely adapted to the respective conditions, and in particular may be circular, square, rectangular, U-shaped or droplet-shaped.

Another embodiment of the system described herein consists in that the fixing means is a cover which is provided with a leadthrough opening for the shank-type tool, which cover engages over that side of the clamping chuck on which the receiving opening is provided such that the reducing sleeve is fixed in the central receptacle, and that the cover is fastened to the body of the clamping chuck.

The provision of a cover designed in this way yields numerous significant advantages: firstly, it permits a significant reduction in radial run-outs that are encountered, because the reducing sleeve can be optimally aligned, and fixed in said position, during the production of the clamping chuck. This facilitates work in particular using long clamping chucks and long tools.

Furthermore, the clamping behavior of the clamping chuck is positively influenced. This is in particular because, owing to the system characteristics, a radial expansion of the clamping chuck causes an increase of the radial preload force owing to interaction between the deformation of the body of the clamping chuck and the clamping chuck.

It is advantageously the case in the clamping chuck that the cover is fastened non-detachably, in particular by clamping, shrink-fitting, welding or brazing or with positively locking detent action, to the clamping chuck. This ensures that a minimization of the radial run-out, once performed, is maintained. It is furthermore advantageous if, alternatively or, better still, in addition to said measure, the cover is connected to the reducing sleeve via a damping element, which can likewise achieve or intensify said effect.

In a particularly advantageous clamping chuck, the cover is composed of a material with a different, in particular higher, strength than the material of which the body of the clamping chuck and/or the reducing sleeve are/is composed. A higher clamping force can be achieved in this way.

An improvement in wear resistance is achieved by virtue of the cover being coated, in particular PVD-coated. In particular, gold-colored covers, for example covers with TiN coating, have proven to be particularly suitable. Other coatings with contrasting color are also advantageous.

Particularly good retention of the tool can be achieved if the reducing sleeve is in the form of a collet chuck.

If a clamping shoulder is provided on the clamping chuck, more precisely on the body thereof or on the reducing sleeve, the radial spreading that occurs in the body of the clamping chuck can advantageously be redirected such that an axial preload through the cover is obtained.

Here, it is advantageous in particular for the cover to have one or more, in particular nozzle-like, openings for the coolant jet. This makes it possible in particular to ensure that a desired coolant jet geometry is set, by means of the configuration of said openings. Here, it is advantageous in particular for an annular gap with a radial extent of between 0.1 mm and 1.5 mm, or bores with a diameter between 0.2 mm and 2.5 mm, to be provided.

It is also particularly advantageous if an actuating element 23 for the longitudinal adjustment of the tool receptacle is arranged on the reducing sleeve or on the chuck main body.

BRIEF DESCRIPTION OF THE DRAWINGS

Embodiments of the system described herein will be explained in more detail below on the basis of a FIGURE, which is briefly described as follows:

The FIGURE provides a cross-sectional illustration of a clamping chuck according to an embodiment of the system described herein.

DETAILED DESCRIPTION OF VARIOUS EMBODIMENTS

The FIGURE shows a cross section through a clamping chuck. The clamping chuck 10 has a body 11. A shank-type tool that is not part of the clamping chuck 10 is inserted axially, in particular on an axis about which the clamping chuck 10 rotates during the operation of a machine tool (not illustrated) on which the clamping chuck 10 is arranged, into a reducing sleeve 12 arranged in a receptacle in the body 11 of the clamping chuck 10, such that the receptacle is substantially filled by the reducing sleeve 12 and by the inserted section of the shank-type tool 15. The reducing sleeve 12 is secured against twisting by means of an anti-twist securing means 17.

As a clamping device 18, an annularly encircling pressure chamber is arranged in the body 1. To fix the inserted shank-type tool 15, said pressure chamber can be filled with hydraulic liquid at a pressure of several 100 000 000 Pa, which leads in particular to an elastic deformation of the wall sections 18*a*, which reduces the cross section of the receptacle and thereby causes the reducing sleeve 12, and the shank-type tool 15 inserted therein, to be firmly clamped.

A cup-shaped cover 13 which is provided with a leadthrough opening for the shank-type tool 15 engages over that side of the body 11 of the clamping chuck 10 on which the receiving opening is provided, specifically such that the reducing sleeve 12 is fixed in the central receptacle. The connection between cover 13 and reducing sleeve 12 is produced, in the embodiment illustrated, via a damping element 21. The cover 13 is fastened to the body 11 of the clamping chuck 10 by means of weld points such as the weld point 19 which is illustrated by way of example. Elastic deformations of the body 11 of the clamping chuck 10 caused by the pressure of the hydraulic liquid are transmitted, owing to the fastening, to the cover 13, whereby the occurring clamping forces are increased and influenced in terms of direction.

The illustrated clamping chuck 10 is designed to permit peripheral cooling of the shank-type tool 15. In an embodiment, seals 16, which may for example be in the form of O-rings, may be provided at points at which an ingress of the coolant between cover 13 and body 11 of the clamping chuck 10 could occur.

To achieve that the coolant emerges onto the shank-type tool, an annular outlet gap 14 is provided between shank-type tool 15 and cover 13. Coolant can pass into the region of the outlet gap in particular if it is conducted through gaps or ducts in the body 11 of the clamping chuck 10 and/or of the reducing sleeve 12 into the region 20 between cover 13 at one side and body 11 and/or reducing sleeve 12 at the other side.

Other embodiments of the invention will be apparent to those skilled in the art from a consideration of the specification or practice of the invention disclosed herein. It is intended that the specification and examples be considered as exemplary only, with the true scope and spirit of the invention being indicated by the following claims.

LIST OF REFERENCE NUMERALS

10 Clamping chuck
11 Body
12 Reducing sleeve
13 Cover
14 Outlet gap
15 Shank-type tool
16 Seal
17 Anti-twist securing means
18 Clamping device
18a Wall sections
19 Weld point
20 Region
21 Damping element

The invention claimed is:

1. A clamping chuck for a machine tool, comprising:
a receptacle which is arranged in a body of the clamping chuck and which has a receiving opening for the axial insertion of a shank-type tool;
a reducing sleeve arranged at least in sections in the receptacle and mounted in a freely floating manner;
a clamping device for the at least local reduction of the cross section of the receptacle; and
a fixing device which prescribes a defined arrangement of the reducing sleeve relative to the receiving opening both when the clamping chuck is clamped and also when the clamping chuck is not clamped, wherein the fixing device has at least one of: an axial securing device which limits a displacement of the reducing sleeve in the receiving opening or an anti-twist securing device which limits a twisting motion of the reducing sleeve in the receiving opening by elastic action.

2. The clamping chuck as claimed in claim 1, wherein, in the defined arrangement of the reducing sleeve relative to receiving opening, eccentricities of reducing sleeve and receiving opening or clamping chuck are coordinated with one another in compensatory fashion.

3. The clamping chuck as claimed in claim 2, further comprising:
a marking, on the basis of which the arrangement in which the eccentricities are coordinated with one another are identifiable.

4. The clamping chuck as claimed in claim 3, wherein the marking is provided on the reducing sleeve.

5. The clamping chuck as claimed in claim 1, wherein the limitation of the displacement of the reducing sleeve in the receiving opening is realized with elastic action.

6. The clamping chuck as claimed in claim 1 wherein the reducing sleeve, on a side facing toward the surface of the receiving opening, has grooves which extend parallel to an axis of rotation of the reducing sleeve proceeding from the two face sides of the reducing sleeve but which do not merge into one another.

7. The clamping chuck as claimed in claim 1, wherein peripheral cooling for the shank-type tool is provided.

8. The clamping chuck as claimed in claim 7, wherein the peripheral cooling is directed and is diverted in nozzle-like fashion onto the shank-type tool.

9. The clamping chuck as claimed in claim 7, wherein a coolant provided for the peripheral cooling is directed in parallel along shank and cutting edge of the shank-type tool.

10. The clamping chuck as claimed in claim 7, wherein at least one of: the clamping device or the reducing sleeve has one or more slots, one or more bores or one or more openings for permitting the passage of coolant.

11. The clamping chuck as claimed in claim 1, wherein the fixing device is a cover which is provided with a leadthrough opening for the shank-type tool, wherein the cover engages over a side of the clamping chuck on which the receiving opening is provided such that the reducing sleeve is fixed in the receptacle, and wherein the cover is fastened to the body of the clamping chuck.

12. The clamping chuck as claimed in claim 11, wherein the cover is fastened to the body of the clamping chuck.

13. The clamping chuck as claimed in claim 12, wherein the cover is fastened by at least one of: clamping, shrink-fitting, welding, brazing, or with positively locking detent action.

14. The clamping chuck as claimed in claim 11, wherein the cover is composed of a material with a higher strength than at least one of: the body of the clamping chuck or the reducing sleeve.

15. The clamping chuck as claimed in claim 11, wherein the cover is of gold color or of contrasting color.

16. The clamping chuck as claimed in claim 11, wherein the cover is coated with TiN.

17. The clamping chuck as claimed in claim 1, further comprising:
an actuating element for the longitudinal adjustment of the receptacle, wherein the actuating element is arranged on the reducing sleeve or on the body of the clamping chuck.

* * * * *